No. 819,154. PATENTED MAY 1, 1906.
R. W. MINERD.
MINER'S TOOL.
APPLICATION FILED NOV. 1, 1904.
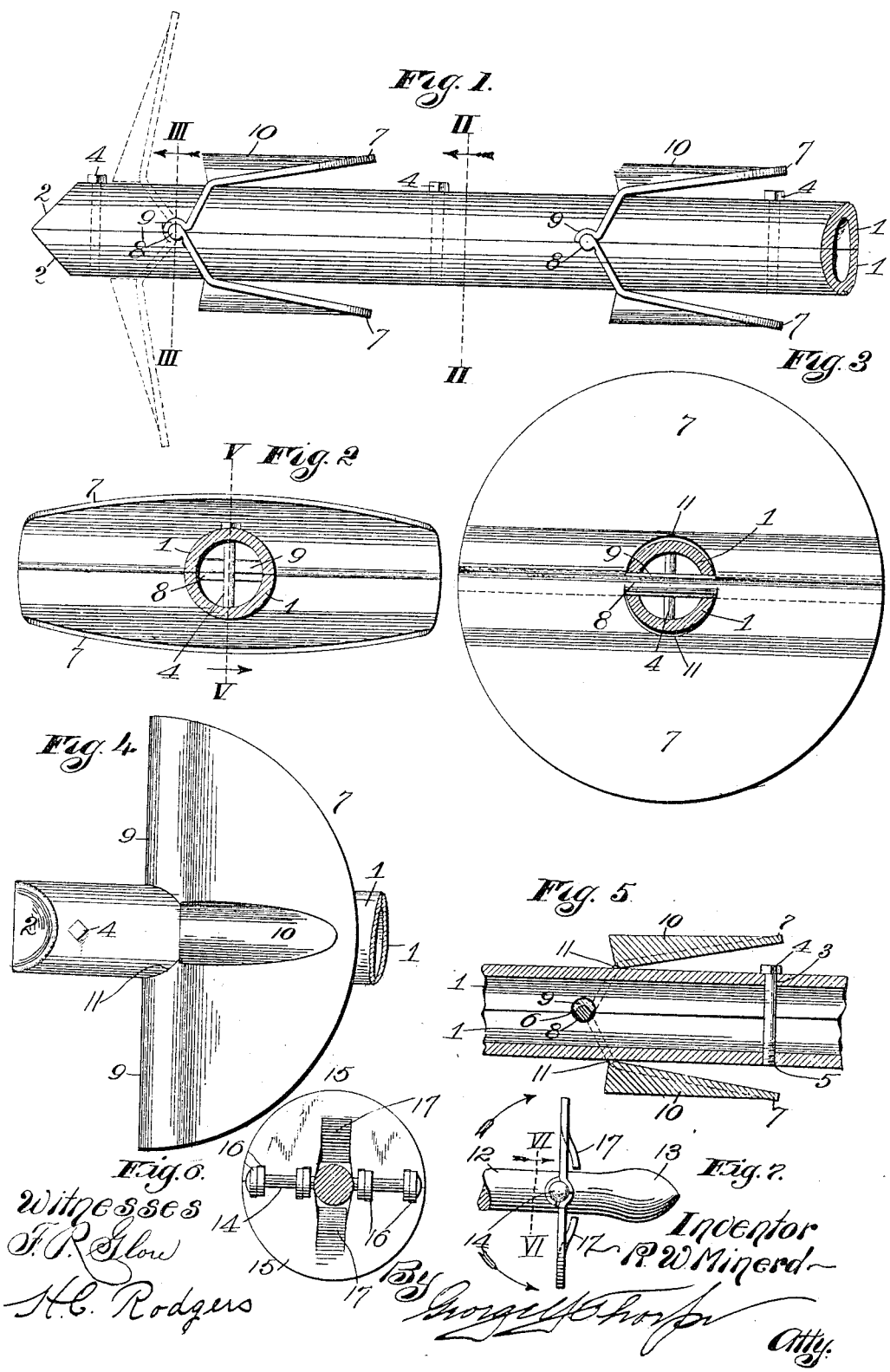

UNITED STATES PATENT OFFICE.

ROBERT W. MINERD, OF PITTSBURG, KANSAS.

MINER'S TOOL.

No. 819,154.  Specification of Letters Patent.  Patented May 1, 1906.

Application filed November 1, 1904. Serial No. 230,984.

*To all whom it may concern:*

Be it known that I, ROBERT W. MINERD, a citizen of the United States, residing at Pittsburg, in the county of Crawford and State of Kansas, have invented certain new and useful Improvements in Miners' Tools, of which the following is a specification.

My invention relates to miners' tools, and more especially to one for removing the cuttings from holes drilled for blasting purposes in coal-mines or any other mines or for clean-out purposes in steam-boiler flues.

My object is to produce a miner's tool of this character which is efficient and reliable in operation, light and easily handled, and of simple, strong, durable, and cheap construction.

With this object in view the invention consists in certain novel and peculiar features of construction and organization, as hereinafter described and claimed; and in order that it may be fully understood reference is to be had to the accompanying drawings, in which—

Figure 1 is a top view of a miner's tool embodying my invention. Fig. 2 is a cross-section on the line II II of Fig. 1. Fig. 3 is a cross-section on the line III III of Fig. 1, but with the contiguous spoons occupying their operative positions as in dotted lines, Fig. 1. Fig. 4 is a side elevation of a portion of the tool. Fig. 5 is a section on the line V V of Fig. 2. Fig. 6 is a section on the line VI VI of Fig. 7, and Fig. 7 is a side elevation of a modified form of the tool.

In the said drawings the handle 1 is composed of two similar semicylindrical portions fitted together, as shown, the front ends of said sections being tapered forward, as at 2, so that the front end of the handle shall be pointed as viewed from the top. One section of the handle is provided with smooth holes 3 to receive the bolts 4 and the other section with screw-holes 5 to be engaged by the threaded ends of said bolts 4, which are thus utilized to unite the handle-sections rigidly together.

At preferably two points—one near the front end of the tool and the other a short distance rearward of the same—the meeting edges of the sections are provided with registering holes 6 for a purpose which hereinafter appears.

The spoons each consist of two sections 7, semicircular in form as viewed from their front or rear side and of substantially obtuse angle form as viewed from the upper or lower edge. The sections are of materially greater diameter than the handle, and one of them at its straight or diametric margin is formed with a substantially circular cross and pivot rod 8 and the other at the corresponding edge with a semicylindrical cross-rod 9, which fits pivotally upon rod 8, so that the two sections of the spoon are, in effect, hinged together, being, furthermore, hinged to the handle by having said cross-rods 8 and 9 journaled in opposite openings 6 and bridging the handle, as shown clearly. By this arrangement it will be seen that the spoon-sections may occupy the relation shown in the full or dotted lines, Fig. 1, the former position being that which they assume when the tool is shoved into the drill-hole and the latter the position which they assume as the tool is drawn back, the accumulation of cuttings in the hole acting as a wedge between the handle and the spoon-sections to force the latter to their open position, and to arrest and hold them rigidly in the last-named position without danger of breakage they are provided with ribs 10 at their front sides, which by endwise pressure against the handle prevent the spoon-sections from swinging forward to the position last referred to.

The advantage of bending the sections to substantially obtuse-angle form, as shown in Fig. 1, is threefold—first, it permits the outer or larger portion of the section to assume a position almost parallel with the handle, and thus enable the tool to be more easily slipped into the drill-hole, and, secondly, it makes the spoon-sections stiffer and stronger than they would be if not of such angular formation. Furthermore, it permits the inner curved edges 11 of the sections to be struck from an axis corresponding substantially to the axis of the handle, and thus provides for a snug fit of such edges upon the handle when in operative or inopertaive position and leaves such a small space between said portions while swinging from the position shown in full to the position shown in dotted lines as to prevent the cuttings working between the edge of the spoons and the handle and interfering with the opening movement of the spoon-sections.

In practice the tool, with the spoons closed or in their folded position, is shoved into the drill-hole the required distance or until the point of the handle strikes the base of the hole. The tool is then withdrawn, this action, as hereinbefore explained, causing the spoons to open and to force the accumulation of cuttings out ahead of them.

In Figs. 6 and 7 the tool is shown as comprising a rod 12, preferably solid, as shown, and having its front end tapered to a point, as at 13, and provided rearward of said point with a cross-rod 14. The spoons in this modified form consist of two semicircular sections 15, equipped at their straight margins with loops 16, pivotally engaging the rod 14, and out of each section is stamped a tongue 17 to project forward of the spoon and when the latter is open impinge against the rod, so as to limit the opening movement of the spoon-sections in the direction indicated by the arrow, Fig. 7. When the tool is inoperative, said sections are swung in the opposite direction to that indicated by said arrows, as will be readily understood. It will be apparent that this modified construction possesses all of the advantages of the construction shown in Figs. 1 to 5, inclusive, and an additional advantage in that it can be made and sold at a materially lower cost.

From the above description it will be apparent that I have produced a miner's tool which possesses the features of advantage enumerated as desirable and which can obviously be modified in various other particulars without departing from the essential spirit and scope or sacrificing any of its advantages.

Having thus described the invention, what I claim as new, and desire to secure by Letters Patent, is—

A miner's tool, comprising a handle, composed of two sections secured together and provided with registering grooves forming diametric openings, and one or more spoons, each spoon consisting of two sections substantially semicircular in form, one of said spoon-sections having a cross-rod at its straight edge and the other a semicircular cross-rod at its corresponding edge and pivoted to the cross-rod of the first-named spoon-section, said cross-rods extending pivotally through the diametric openings of the handle.

In testimony whereof I affix my signature in the presence of two witnesses.

ROBERT W. MINERD.

Witnesses:
CHARLES WATSON,
A. M. MINERD.